United States Patent [19]
Mochida et al.

[11] Patent Number: 6,106,791
[45] Date of Patent: Aug. 22, 2000

[54] EXHAUST GAS TREATING SYSTEMS

[75] Inventors: Isao Mochida, Fukuoka-ken; Akinori Yasutake; Toshihiko Setoguchi, both of Nagasaki-ken; Norihisa Kobayashi, Tokyo; Takahiro Kasuh; Masaaki Yoshikawa, both of Osaka-fu, all of Japan

[73] Assignees: Mitsubishi Jukogyo Kabushiki Kaisha, Tokyo; Osaka Gas Company Limited, Osaka, both of Japan

[21] Appl. No.: 09/219,870

[22] Filed: Dec. 24, 1998

Related U.S. Application Data

[63] Continuation of application No. 08/776,519, Jul. 18, 1997, abandoned.

[30] Foreign Application Priority Data

| Jun. 28, 1995 | [JP] | Japan | 7-162650 |
| Oct. 17, 1995 | [JP] | Japan | 7-268296 |
| Oct. 20, 1995 | [JP] | Japan | 7-272280 |
| Nov. 2, 1995 | [JP] | Japan | 7-285664 |
| Nov. 2, 1995 | [JP] | Japan | 7-285666 |

[51] Int. Cl.⁷ .................................. B01D 53/60
[52] U.S. Cl. ................ 423/239.1; 423/244.01; 423/522
[58] Field of Search ............ 423/239.1, 244.03, 423/244.09, 244.01, 522

[56] References Cited

U.S. PATENT DOCUMENTS

| 3,639,953 | 2/1972 | Kimura et al. | 423/447.6 |
| 4,210,628 | 7/1980 | Ninomiya et al. | 423/239.1 |
| 4,500,501 | 2/1985 | Hamada et al. | 423/244.03 |
| 4,921,826 | 5/1990 | Juentgen | 502/180 |

FOREIGN PATENT DOCUMENTS

| 0 439 005 A1 | 7/1991 | European Pat. Off. |
| 0 601 808 A1 | 6/1994 | European Pat. Off. |
| 25 00 082 | 7/1975 | Germany |
| 3 342 508 | 6/1985 | Germany |
| 48-101361 | 12/1973 | Japan |
| 55-51438 | 4/1980 | Japan |
| 6-79176 | 3/1994 | Japan |
| 1 436 245 | 5/1976 | United Kingdom |
| 1 514 171 | 6/1978 | United Kingdom |

OTHER PUBLICATIONS

Patent Abstracts of Japan, vol. 003, No. 087 (C–053), Jul. 25, 1979 & JP 54 064091 A (TOHO Rayon Co. Ltd.), May 23, 1979.

*Primary Examiner*—Steven P. Griffin
*Assistant Examiner*—Stuart L. Hendrickson
*Attorney, Agent, or Firm*—Foley & Lardner

[57] ABSTRACT

An active carbon for use in the treatment of exhaust gas can be obtained by heat-treating a starting active carbon fiber derived from polyacrylonitrile, pitch or the like or a starting particulate active carbon in a non-oxidizing atmosphere. The heat-treating temperature is preferably in the range of 600 to 1,200° C. for use in the desulfurization of exhaust gas, and in range of 600 to 1,000° C. for use in the denitration of exhaust gas. By using the resulting heat-treated active carbon for the purpose of desulfurization, the sulfur oxide concentration in exhaust gas can be reduced to 5 ppm or below. Moreover, by using the heat-treated active carbon in combination with conventional denitration based on selective catalytic reduction, the nitrogen oxide concentration in exhaust gas can be reduced to 1 ppm or below.

5 Claims, 17 Drawing Sheets

FIG. 2
(a) Hydrophilic surface
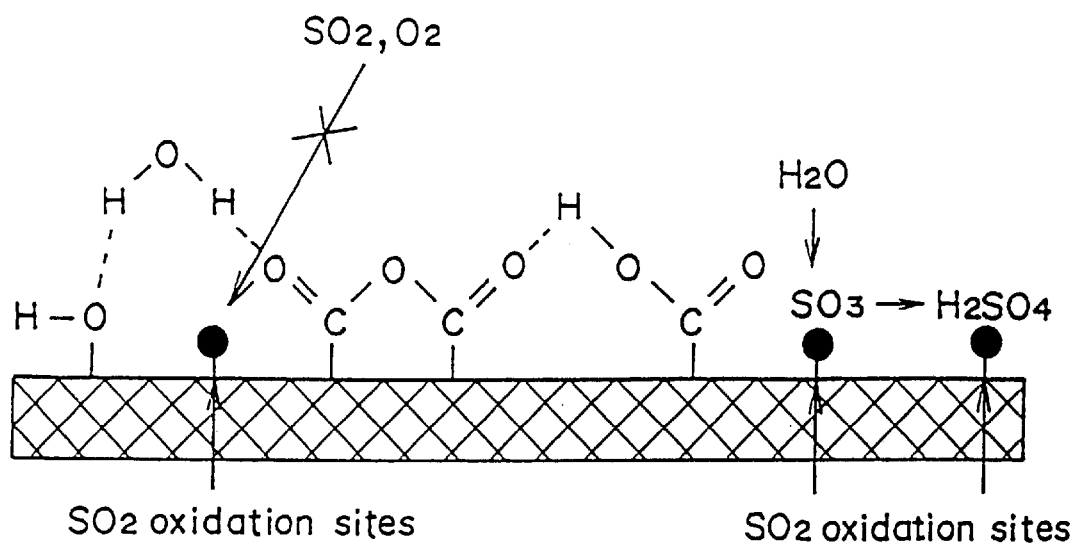
(b) Hydrophobic surface
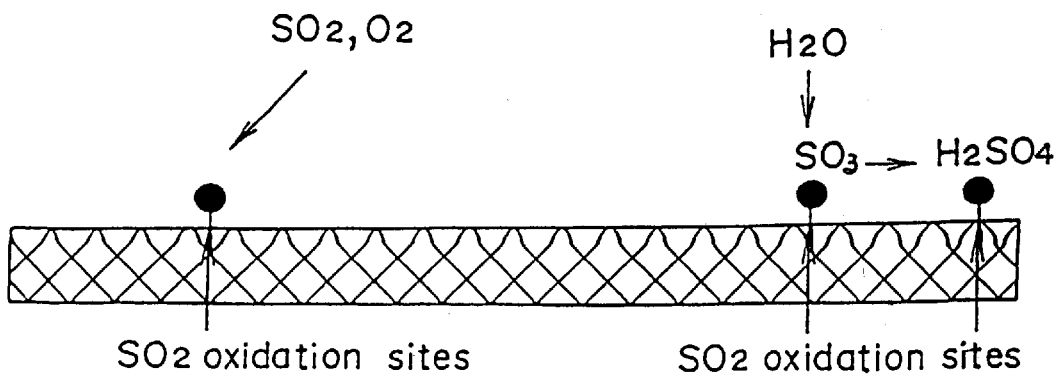

Performance on the Oxidation of NO to $NO_2$ (Conditions)
    Temperature of the gas to be treated: 25°C
    Composition of the gas to be treated:
        NO: 380 ppm
        $O_2$: 4.0%
        $H_2O$: Relative humidity 60%
    W/F = 1 x $10^{-2}$ g·min/ml Performance on the Oxidation of $SO_2$ to $SO_3$ (Conditions)
  Temperature of the gas to be treated: 30°C
  Composition of the gas to be treated:
    $SO_2$: 500 ppm
    $O_2$: 5 vol.%
    $H_2O$: 10 vol.%
  W/F = $5.0 \times 10^{-4}$ g·min/ml (W/F is a value obtained by dividing the amount of active carbon fiber packed by the flow rate of the gas to be treated.)

EXHAUST GAS TREATING SYSTEMS

This is a continuation of abandoned application Ser. No. 08/776,519 filed Jul. 18, 1997.

TECHNICAL FIELD

This invention relates to exhaust gas treating systems for the removal of nitrogen oxides ($NO_x$) and sulfur oxides ($SO_x$) present in exhaust gas discharged from boilers, gas turbines, engines and combustion furnaces for burning various types of fuel.

This invention can also be suitably used for the removal of nitrogen oxides present in tunnels and for the removal of nitrogen oxides present in exhaust gas from nitric acid production plants.

BACKGROUND ART

An example of exhaust gas treatment by means of a conventional exhaust gas treating system is explained with reference to FIG. 1.

In FIG. 1, reference numeral 1 designates a boiler; 2, a denitrator; 3, an air preheater; 4, a dust collector; 5, a gas-gas heater; 6, a desulfurizer; and 7, a stack.

As shown in FIG. 1, a denitrator 2 using a catalyst is installed at the outlet of a boiler 1 or the like, and an air preheater 3 is installed at the outlet of denitrator 2 so as to lower the temperature of the exhaust gas to about 130° C.

The exhaust gas having passed through the aforesaid air preheater 3 is dedusted in a dust precipitator 4, passed through a gas-gas heater 5 and then introduced into a desulfurizer 6 where sulfur oxides ($SO_x$) are removed therefrom. Thereafter, the exhaust gas is discharged into the atmosphere through a stack 7.

In order to remove sulfur oxides ($SO_x$) from exhaust in the aforesaid desulfurizer 6, there has conventionally been employed the so-called lime-gypsum method in which the aforesaid sulfur oxides ($SO_x$) are absorbed with the aid of calcium carbonate used as absorbing agent and recovered in the form of gypsum. In this method, attempts have been made to reduce the outlet concentration of sulfur oxides ($SO_x$) by varying the gas-fluid ratio, the residence time and the like.

Usually, the concentration of sulfur oxides ($SO_x$) in exhaust gas from boilers is in the range of 400 to 800 ppm, and it is intended in the aforesaid lime-gypsum method to reduce the outlet concentration thereof to 50–100 ppm.

However, recent environmental standards demand that the concentration of sulfur oxides ($SO_x$) in exhaust gas should be reduced to a level of 5 ppm or less which is commonly known as a high-degree desulfurization level. In order to remove sulfur oxides ($SO_x$) to a level of 50 to 100 ppm according to the aforesaid conventional lime-gypsum method, a marked increase in cost due to an increased size of equipment and the like is unavoidable, even though the conditions are optimized. Moreover, it is desired from the viewpoint of environmental problems to improve the efficiency of removal of sulfur oxides ($SO_x$).

Furthermore, the aforesaid desulfurizer 6 employs the so-called lime-gypsum method in which sulfur oxides ($SO_x$) present in exhaust gas are absorbed with the aid of calcium carbonate used as absorbing agent and recovered in the form of gypsum. This lime-gypsum method has the disadvantage of requiring a large amount of absorbing agent.

Among dry processes, only an adsorption process using active carbon has been put to practical use. However, this adsorption process uses water washing for the purpose of desorption and hence requires a large volume of water. Moreover, this process also involves problems concerning disposal of the resulting dilute sulfuric acid, drying of the adsorbent, and the like.

As described above, in the current practical process for the removal of nitrogen oxides present in exhaust gas from boilers, there is used a denitrator 2 based on the selective catalytic reduction (SCR) method in which nitrogen oxides are decomposed to nitrogen and water vapor by using a catalyst comprising $V_2O_5$ supported on $TiO_2$ and a reducing agent comprising $NH_3$. However, this process involves the following problems. First, a reaction temperature of 300 to 400° C. is required because of the performance of the catalyst. Secondly, $NH_3$ is required for use as reducing agent. Thirdly, since the current leak level of $NO_x$ is from 5 to 40 ppm, an excess of $NH_3$ needs to be injected for the purpose of reducing the leak level of $NO_x$ to zero.

Moreover, recent environmental standards demand that the concentration of nitrogen oxides ($NO_x$) in exhaust gas should be reduced to a level of 1 ppm or less which is commonly known as a high-degree denitration level. In the aforesaid conventional denitration treatment based on the selective catalytic reduction (SCR) method, a marked increase in cost due to an increased size of equipment and the like is unavoidable, even though the conditions are optimized. On the other hand, it is desired from the viewpoint of environmental problems to improve the efficiency of removal of nitrogen oxides ($NO_x$).

In view of the above-described problems, an object of the present invention is to provide an exhaust gas treating system which can treat exhaust gas at low temperatures without requiring any heating means and, moreover, can treat exhaust gas efficiently without using a large amount of absorbing agent.

DISCLOSURE OF THE INVENTION

In view of the above-described problems of the prior art, the present inventors have made intensive investigations and have now found that an active carbon having been subjected to a specific heat treatment functions as an effective catalyst for desulfurization or denitration reactions. The present invention has been completed on the basis of this finding.

Accordingly, the present invention relates to a heat-treated active carbon for use in desulfurization or denitration reactions and a desulfurization or denitration process using it.

First of all the present invention is described below in terms of desulfurization.

The present invention provides a heat-treated active carbon for use in desulfurization reactions which has been obtained by heat-treating a starting active carbon in a non-oxidizing atmosphere.

The present invention also provides a desulfurization process which comprises bringing a gas containing $SO_2$, water and oxygen into contact with such a heat-treated active carbon for use in desulfurization reactions.

No particular limitation is placed on the type of the starting active carbon. For example, an active carbon fiber or an particulate active carbon is used. Active carbon fibers include those derived from pitch, polyacrylonitrile, phenol, cellulose and the like may be used. Commercial products may also be used. Among others, active carbon having highly hydrophobic surfaces are especially preferred. Specific examples thereof include pitch-based and polyacrylonitrile-based starting active carbon fibers.

The above-described starting active carbon is heat-treated in a non-oxidizing atmosphere. The term "non-oxidizing atmosphere" as used herein comprehends inert gases and reducing atmospheres. No particular limitation is placed on the type of the non-oxidizing atmosphere, so long as the starting active carbon is not oxidized thereby. In particular, inert gases such as nitrogen gas, argon gas and helium gas are preferred. Among them, nitrogen gas is especially preferred because it is readily available.

The heat-treating temperature may be any temperature that renders the surfaces of the starting active carbon hydrophobic. Although the heat-treating temperature may be suitably determined according to the type of the starting active carbon and the like, it is usually in the range of about 600 to 1,200° C. The heat-treating time may be suitably determined according to the heat-treating temperature and the like. This heat treatment makes it possible to obtain the heat-treated active carbon for use in desulfurization reactions according to the present invention. In the heat-treated active carbon for use in desulfurization reactions according to the present invention, all or part of the hydrophilic oxygen-containing functional groups have been removed in the form of CO, $CO_2$ and the like as a result of the heat treatment, so that its surfaces are highly hydrophobic as compared with those before heat treatment. Consequently, the adsorption of $SO_2$ to $SO_2$ oxidation sites occurs easily and, moreover, the discharge of the resulting sulfuric acid proceeds rapidly. Thus, it can perform a catalytic function for desulfurization reactions without hindrance.

The desulfurization process of the present invention comprises the step of bringing a gas containing sulfur dioxide ($SO_2$) into contact with the aforesaid heat-treated active carbon. In this case, the aforesaid gas needs to contain water and oxygen. Although the $SO_2$ concentration can be suitably regulated, efficient desulfurization can be achieved especially at $SO_2$ concentrations of about 20 to 500 ppm.

Exhaust gas can be desulfurized in one step by using the heat-treated active carbon of the present invention. Alternatively, the present invention may also be practiced in the form of a high-degree desulfurization process in which the aforesaid heat-treated active carbon for the treatment of exhaust gas is used to remove sulfur oxides on the downstream side of a desulfurization apparatus based on the lime-gypsum method.

It is desirable that the aforesaid gas contains water at a relative humidity of 100% or greater and oxygen in an amount of 3% by volume or more (preferably 3 to 21% by volume). Any gaseous components other than those described above may be present therein, provided that they do not interfere with desulfurization reactions significantly. For example, nitrogen, carbon dioxide, carbon monoxide and the like may be present therein.

Although the contact temperature can be suitably changed according to the type of the heat-treated active carbon, the $SO_2$ concentration and the like, it may usually be in the range of about 20 to 100° C. Especially in the process of the present invention, efficient desulfurization can be achieved at ordinary temperatures (i.e., about 20 to 50° C.). Even at high temperatures above 100° C., desulfurization reactions can be made to proceed by controlling the water content and the like.

The flow rate of the aforesaid gas can be suitably changed according to the $SO_2$ concentration, the type of the apparatus, and the like. However, it may usually be in the range of about $1 \times 10^{-3}$ to $5 \times 10^{-3}$ g·min/ml per unit weight of the active carbon.

In the process of the present invention, any well-known reactors may be used. For example, various types of reactors such as fixed-bed flow reactors, fluidized-bed reactors and stirred reactors may be used.

The resulting sulfuric acid may be recovered according to various recovery methods including, for example, (a) the method of absorbing the sulfuric acid into water to recover it as concentrated sulfuric acid, (b) the method of absorbing the sulfuric acid into an aqueous solution of KOH to recover it as a neutralized solution, (c) the method of neutralizing the sulfuric acid with an aqueous solution of $Ca(OH)_2$, $Mg(OH)_2$ or the like to recover it as a salt, and (d) the method of absorbing the sulfuric acid into aqueous ammonia to recover it as a fertilizer (i.e., ammonium sulfate).

Similarly to the above-described heat-treated active carbon for use in desulfurization, a heat-treated active carbon for use in denitration can also be obtained by heat-treating a starting active carbon at a temperature of about 600 to 1,000° C. in a non-oxidizing atmosphere. The type of the atmosphere and other conditions may be the same as described above.

A first process of the present invention for removing nitrogen oxides by means of a heat-treated active carbon for use in denitration comprises providing a nitrogen oxide oxidation tower packed with a heat-treated active carbon for use in denitration which has been obtained by heat-treating a starting active carbon at a temperature of 600 to 1,000° C., and passing exhaust gas through the oxidation tower to oxidize and remove nitrogen oxides ($NO_x$) present therein.

A second process of the present invention for removing nitrogen oxides by means of a heat-treated active carbon for use in denitration comprises providing a plurality of adsorption towers packed with a heat-treated active carbon for use in denitration which has been obtained by heat-treating a starting active carbon at a temperature of 600 to 1,000° C., the adsorption towers being arranged in parallel; and passing exhaust gas successively through the adsorption towers in such a way that the exhaust gas is switched from one adsorption tower to another before a breakthrough of the nitrogen dioxide ($NO_2$) adsorbed on the heat-treated active carbon for use in denitration within the one adsorption tower occurs, and nitrogen oxides ($NO_x$) present in the exhaust gas are thereby oxidized, adsorbed and removed continuously.

Moreover, in a high-degree denitration process in accordance with the present invention, nitrogen oxides can be removed by using a heat-treated active carbon for use in denitration, on the downstream side of a denitration treatment based on the selective catalytic reduction (SCR) method.

In the aforesaid processes for the removal of nitrogen oxides, it is preferable to treat the exhaust gas at a temperature of as low as 150° C. or below.

In the aforesaid processes for the removal of nitrogen oxides, the nitrogen oxides oxidized by the heat-treated active carbon for use in denitration can be continuously absorbed into an absorbing fluid such as water or an aqueous alkaline solution, and recovered as nitric acid or a salt thereof.

In the aforesaid processes for the removal of nitrogen oxides, no particular limitation is placed on the type of the starting active carbon, as is the case with the heat-treated active carbon for use in desulfurization. However, it is desirable to use a polyacrylonitrile-based or pitch-based starting active carbon fiber as the starting active carbon fiber.

According to the present invention, the desulfurization performance of a starting active carbon can be improved by heat-treating it in a non-oxidizing atmosphere. The principle thereof is illustrated in FIG. 2.

Prior to heat treatment, the surface of the starting active carbon has many oxygen-containing functional groups distributed thereover as shown in FIG. 2(a), and hence exhibits hydrophilicity. In this case, surface water hinders $SO_2$ from being adsorbed to $SO_2$ oxidation sites. Moreover, sulfuric acid formed by oxidation and hydration is captured by surface water and accumulated on the surface of the starting active carbon, thus hindering desulfurization reactions from proceeding smoothly.

In contrast, hydrophilic oxygen-containing functional groups have been removed, in the form of CO, $CO_2$ and the like, from the surface of the heat-treated active carbon, as shown in FIG. 2(b). Thus, its surface exhibits hydrophobicity. Consequently, $SO_2$ is readily adsorbed to $SO_2$ oxidation sites and, moreover, the resulting sulfuric acid is eliminated rapidly, so that the heat-treated active carbon of the present invention exhibits a high activity for desulfurization reactions without being hindered by sulfuric acid.

In order to remove sulfur oxides ($SO_x$) present in exhaust gas by means of a heat-treated active carbon as described above, the exhaust gas is conditioned so as to have a temperature of 100° C. or below, preferably 50° C. or below, and a relative humidity of 100% or greater. Thereafter, the exhaust gas is introduced into a reactor packed with the heat-treated active carbon where sulfur oxides ($SO_2$) present therein are oxidized to sulfur trioxide ($SO_3$) at the surfaces of the heat-treated active carbon. Then, this sulfur trioxide ($SO_3$) is reacted with water or an aqueous solution of sodium hydroxide or the like to recover it as sulfuric acid or a salt thereof. Thus, sulfur oxides ($SO_x$) present in exhaust gas can be removed.

Ordinary active carbon have the property of adsorbing nitrogen monoxide (NO), but fail to exhibit sufficient oxidizing power. Although some of them have oxidizing power, their surface structure makes it difficult to remove nitrogen oxides in the form of nitrogen dioxide ($NO_2$).

The reason for this is that plenty of oxygen-containing groups (such as carbonyl and carboxyl groups) and N- or S-containing groups remain on the surface of such active carbon.

According to the present invention, a starting active carbon is heat-treated in a non-oxidizing atmosphere. This decomposes and eliminates various groups present on the surfaces of the starting active carbon to activate NO oxidation sites. Moreover, hydrophilic oxygen-containing functional groups are also decomposed to decrease water ($H_2O$) adsorption sites which hinder the adsorption of NO and the elimination of $NO_2$. Thus, an improvement in NO-oxidizing activity can be achieved.

When an active carbon which has been heat-treated in this manner is used, nitrogen monoxide (NO) present in exhaust gas is adsorbed thereon, and then oxidized by $O_2$ to form nitrogen dioxide ($NO_2$).

This nitrogen dioxide ($NO_2$) may be removed in the state adsorbed on the active carbon. Alternatively, the desorbed nitrogen dioxide ($NO_2$) may be absorbed into water and recovered in the form of an aqueous solution of nitric acid, or may be absorbed into an aqueous alkaline solution and recovered in the form a salt of nitric acid. Thus, exhaust gas can be denitrated in the above-described manner.

As described above, the present invention makes it possible to remove nitrogen oxides and sulfur oxides from exhaust gas at a low temperature of 150° C. or below by using a heat-treated active carbon.

Accordingly, a system in accordance with the present invention may be used as a substitute for the currently used denitrators and desulfurizers. Alternatively, when it is desired to improve the denitration or desulfurization performance of the current system, a system in accordance with the present invention may be connected therewith to achieve a further improvement in treating capacity.

Moreover, the desulfurization processes of the present invention using a heat-treated carbon for use in desulfurization reactions make it possible to desulfurize exhaust gas efficiently without using a large volume of water (i.e., in a dry manner). Especially when a heat-treated pitch-based carbon fiber for use in desulfurization reactions is used, the degree of removal of $SO_2$ may be raised to 100% depending on the temperature used for the heat treatment.

Furthermore, as shown in FIG. 18, the $SO_2$ adsorbed on the surface of a heat-treated active carbon for use in desulfurization reactions according to the present invention is oxidized by $O_2$ present in the gas to form $SO_3$, and the latter reacts with water present in the gas to form sulfuric acid. Then, this sulfuring acid is washed away from the surface. That is, by treating sulfur oxides-containing exhaust gas with a heat-treated active carbon, the concentration of sulfur oxides ($SO_x$) in the exhaust gas can be reduced to a level of 5 ppm or less which has been difficult to achieve in the prior art, and such sulfur oxides can be recovered in the form of sulfuric acid (in particular, concentrated sulfuric acid).

Furthermore, according to the present invention, the nitrogen oxides oxidized on a heat-treated active carbon can be continuously treated by converting them into nitric acid or a salt thereof in an absorption tower. In addition, by carrying out high-degree denitration using a heat-treated active carbon in combination with conventional denitration based on selective catalytic reduction using a $V_2O_5$ catalyst, the concentration of nitrogen oxides ($NO_x$) in exhaust gas can be reduced to a level of 1 ppm or less which has been difficult to achieve in the prior art.

The heat-treated active carbon for use in desulfurization reactions and the desulfurization processes, and the heat-treated active carbon for use in denitration reactions and the denitration processes, which are provided by the present invention, may be suitably used for the removal of sulfur oxides and nitrogen oxides produced in combustion equipment (such as boilers and thermal electric power plants) especially for burning heavy oil, coal and the like, sulfuric acid production plants, nitric acid production plants, metal processing works and facilities, paper mills, and tunnels.

BRIEF DESCRIPTION OF THE DRAWINGS

FIGS. 2(a) and 2(b) are schematic views showing the surface states of an active carbon before high-temperature treatment and an active carbon in accordance with the present invention, respectively;

BEST MODE FOR CARRYING OUT THE INVENTION

The features of the present invention are more specifically described hereinbelow with reference to the following examples and comparative examples.

EXAMPLE 1

A pitch-based starting active carbon ("OG-20A"; manufactured by Osaka Gas Co., Ltd.) and a starting particulate active carbon ("HC-30"; manufactured by Turumicoal Co., Ltd) were used as the starting active carbon fiber. A series of heat-treated active carbon were obtained by firing the starting active carbon at various temperatures ranging from 400 to 1,400° C. in an atmosphere of nitrogen for an hour.

Then, each of the heat-treated active carbon thus obtained was used in a desulfurization reaction to examine the desulfurization performance thereof. In this desulfurization reaction, a gas composed of 1,000 ppm of $SO_2$, 5 vol. % of $O_2$, 10 vol. % of water and the balance $N_2$ was used. Using a fixed-bed flow reactor, the aforesaid gas was passed therethrough at a temperature of 30° C. in an amount of 1.0 g·min/ml per unit weight of the active carbon. The $SO_2$ concentration in the gas emerging from the outlet of the reactor was measured with a gas chromatograph having a FPD detector, and the degree of $SO_2$ removal was calculated. The results obtained 15 hours after the start of the desulfurization reaction are shown in FIG. 3.

Figure 1:
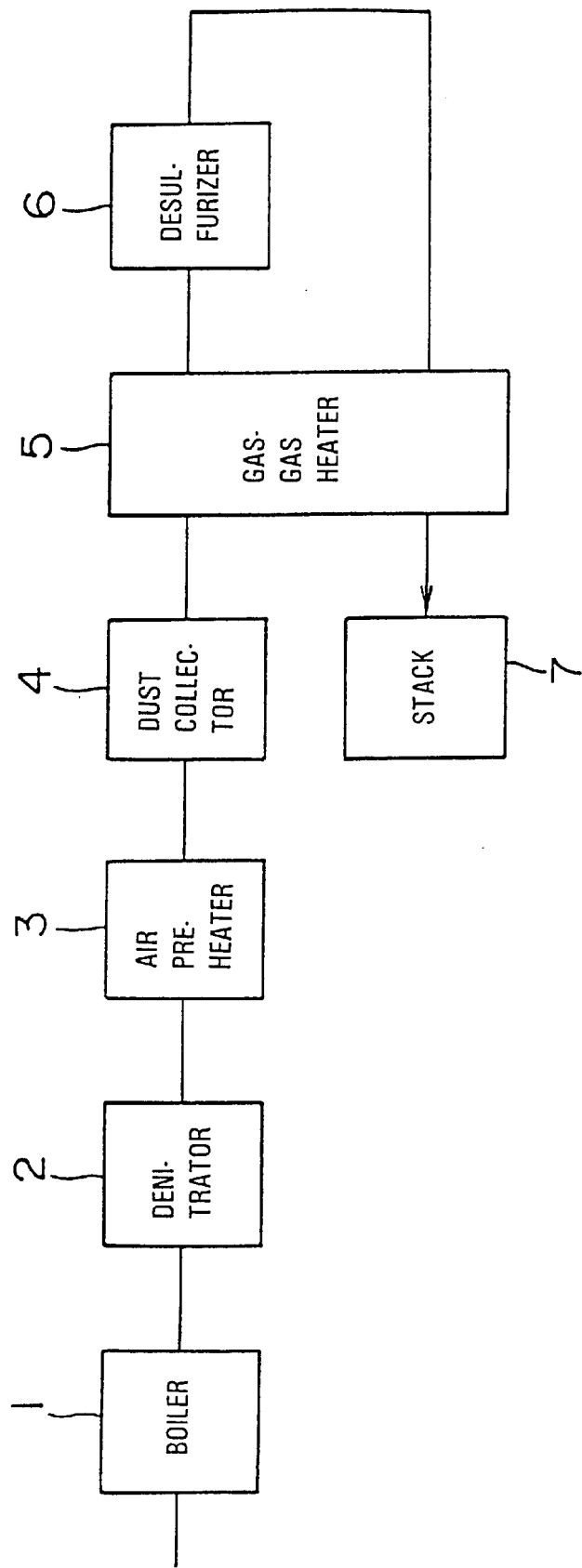
FIG. 1 is a block diagram of a conventional exhaust gas treating system.
Figure 3:
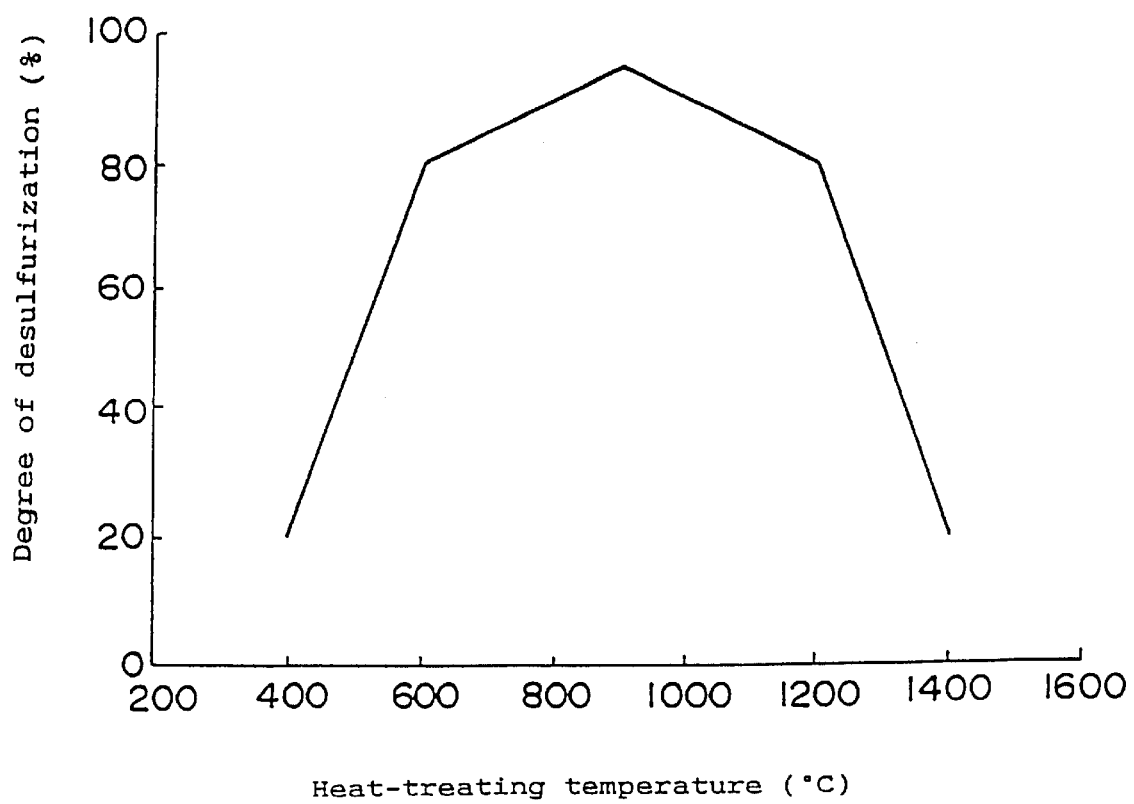
FIG. 3 is a graph showing the relationship between the heat-treating temperature of a pitch-based carbon fiber or a particulate active carbon and the degree of desulfurization.

As shown in FIG. 3, their activities vary according to the heat-treating temperature.

Thus, heat-treating temperatures in the range of, 600 to 1,200° C. have been judged to be effective. In the present invention, therefore, an active carbon heat-treated at a temperature in this range is used to enhance the catalytic activity for the oxidation of sulfur dioxide ($SO_2$) and sulfur trioxide ($SO_3$) and treat them without being influenced by other coexisting gases such as CO and $CO_2$.

As a result, it has been become possible to remove low concentrations of sulfur dioxide ($SO_2$) and sulfur trioxide ($SO_3$).

Comparative Example 1

A desulfurization reaction was carried out in the same manner as described in Example 1, except that the aforesaid pitch-based active carbon fiber was used without being fired. Thus, the degree of $SO_2$ removal was calculated. As a result, the degree of $SO_2$ removal was found to be as low as 20%, indicating that $SO_2$ could not be fully removed.

EXAMPLE 2

Figure 4:
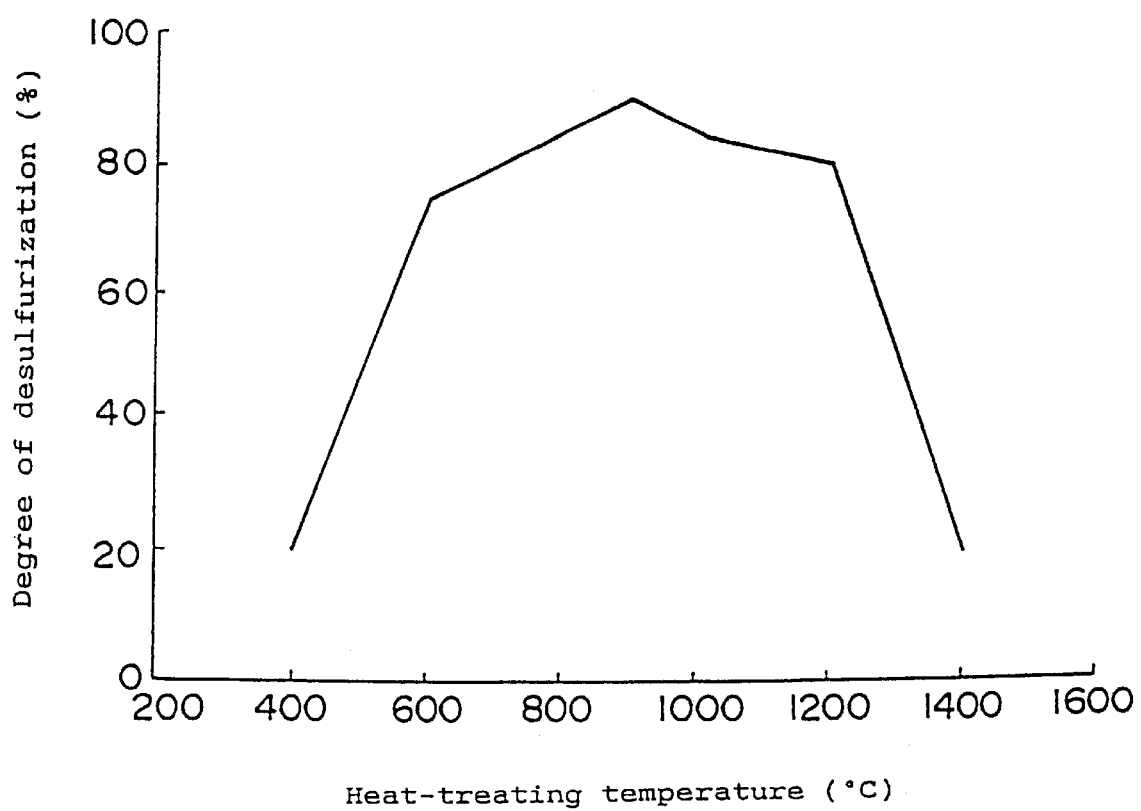
FIG. 4 is a graph showing the relationship between the heat-treating temperature of a polyacrylonitrile (PAN)-based carbon fiber and the degree of desulfurization.

A polyacrylonitrile-based active carbon fiber ("FE-300"; manufactured by Toho Rayon Co., Ltd.) was used as the starting active carbon fiber. This active carbon fiber was heat-treated in the same manner as described in Example 1. Then, each of the heat-treated active carbon fibers was used in a desulfurization reaction and the degree of $SO_2$ removal was calculated. The results thus obtained are shown in FIG. 4.

Again, their activities vary according to the heat-treating temperature. Thus, heat-treating temperatures in the range of 600 to 1200° C. have been judged to be effective. In the present invention, therefore, an active carbon fiber heat-treated at a temperature in this range is used to remove sulfur dioxide ($SO_2$) and sulfur trioxide ($SO_3$).

EXAMPLE 3

Figure 5:
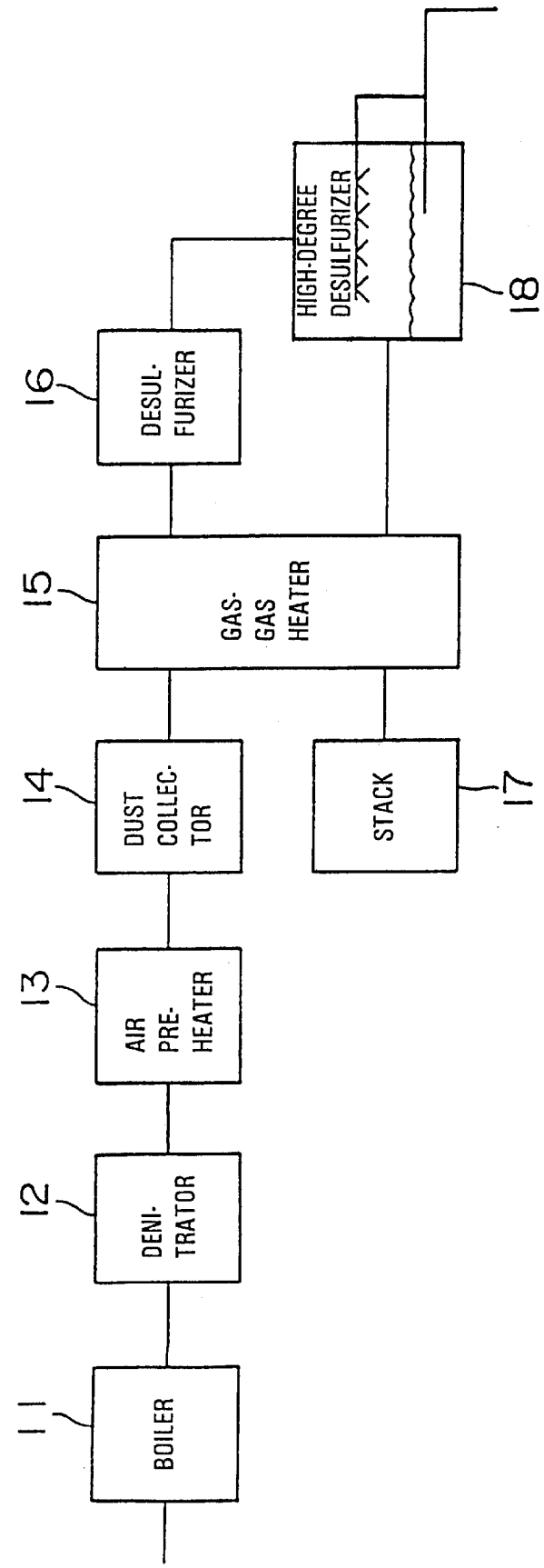
FIG. 5 is a block diagram of an exemplary system for carrying out the high-degree desulfurization process of the present invention.

FIG. 5 illustrates an exhaust gas desulfurization system in accordance with one embodiment of the present invention.

In FIG. 5, reference numeral 11 designates a boiler; 12, a denitrator; 13, an air preheater; 14, a dust collector; 15, a gas-gas heater; 16, a desulfurizer; 17, a stack; and 18, a high-degree desulfurizer.

As shown in FIG. 5, exhaust gas discharged from a boiler 11 is passed through a denitrator 12 and a desulfurizer 16 where nitrogen oxides ($NO_x$) and sulfur oxides ($SO_x$) are removed therefrom in the same manner as in the prior art.

Thereafter, the exhaust gas is introduced into a high-degree desulfurizer 18 where it is brought into contact with an active carbon fiber heat-treated at a temperature in the range of 600 to 1,200° C. and packed into high-degree desulfurizer 18, so that the reactions represented by the following equations (a) and (b) are promoted. Thus, the concentration of sulfur oxides ($SO_x$) in the exhaust gas could be reduced to 5 ppm or less.

$SO_2 + 1/2 O_2 \rightarrow SO_3$ (a)

$SO_3 + H_2O \rightarrow H_2SO_4$ (b)

The treating conditions employed in this example are given below.
(Treating Conditions)
a) Gas to be treated
Temperature: 50° C.
Relative humidity: 100% R.H.
$SO_x$ concentration: 120 ppm
Flow rate: 50 m³/hr b) Desulfurizer Active carbon fiber: OG-20A Amount of catalyst: 0.5 kg c) Desulfurized gas $SO_x$ concentration: 5 ppm In this removal of sulfur oxides ($SO_x$), the water used in the aforesaid high-degree desulfurizer 18 may be replaced by an aqueous solution of sodium hydroxide or the like. Thus, the sulfur-oxides ($SO_x$) can be recovered as a salt of sulfuric acid (e.g., sodium sulfate) instead of sulfuric acid.

The heat-treated active carbon fiber packed into the aforesaid high-degree desulfurizer 18 is one obtained by firing a pitch-based starting active carbon fiber (i.e., an active carbon fiber formed by the melt spinning of pitch obtained as residue in coal chemical and petrochemical processes) in a reducing atmosphere.

In this example, there was used a pitch-based active carbon fiber manufactured and sold by Osaka Gas Co., Ltd. under the trade name of "OG-20A". This pitch-derived active carbon fiber was fired at about 1,100° C. in a reducing atmosphere for an hour, shaped into a corrugated form, and then used in this example.

Moreover, a polyacrylonitrile (PAN)-based active carbon fiber obtained by firing and carbonizing a high-molecular-weight polyacrylonitrile fiber was also used as the heat-treated active carbon fiber. Thus, the concentration of sulfur oxides ($SO_x$) in exhaust gas could be reduced to 5 ppm or less in the same manner as described above.

EXAMPLE 4

A pitch-based starting active carbon fiber ["OG-5A" (trade name); manufactured by Osaka Gas Co., Ltd.] formed by the melt spinning of pitch obtained as residue in coal chemical and petrochemical processes, a polyacrylonitrile-based starting active carbon fiber ["FE-300" (trade name); manufactured by Toho Rayon Co., Ltd.] formed by firing and carbonizing a high-molecular-weight polyacrylonitrile fiber, and a starting particulate active carbon ["HC-30" (trade name); manufactured by Turumicoal Co., Ltd.] were used as starting active carbon. These starting active carbon were fired at various temperatures ranging from 400 to 1,400° C. in an atmosphere of nitrogen for an hour.

Then, the heat-treated active carbon thus obtained were tested for NO-oxidizing activity.

For purposes of comparison, the pitch-based and polyacrylonitrile-based starting active carbon fibers which had not been heat-treated were tested in the same manner.

Specifically, using a fixed-bed flow reactor, a gas composed of 380 ppm of NO, 4.0 vol. % of $O_2$, 2.5 vol. % of $H_2O$ and the balance $N_2$ was passed therethrough at a reaction temperature of 25° C. in an amount (W/F) of $1.0 \times 10^{-2}$ g·min/ml.

Using a chemiluminescent $NO_x$ detector, the effluent gas was analyzed for NO and $NO_2$. Thus, the degree of conversion of NO to $NO_2$ was evaluated.

Figure 6:
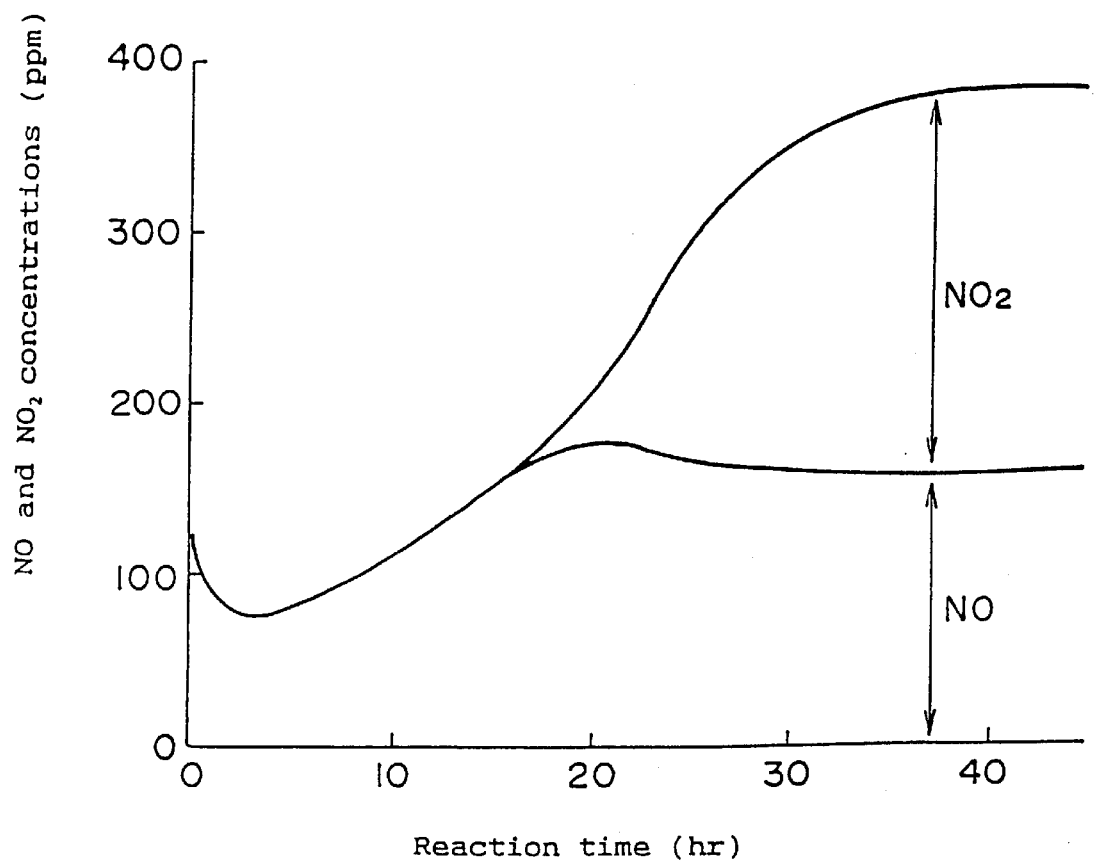
FIG. 6 is a graph showing the relationship between the concentrations of nitrogen oxides and the time of reaction with an active carbon fiber.

When a NO-containing gas is introduced into the pitch-based active carbon fiber, its ability to oxidize and adsorb NO causes the outlet $NO_x$ concentration to be reduced to several tens of parts per million in an initial stage (FIG. 6).

Then, the outlet $NO_2$ concentration increases as a result of breakthrough of $NO_2$. After the lapse of 35 hours or more, a complete breakthrough of $NO_2$ is observed.

However, the degree of conversion of NO to $NO_2$ remains substantially constant thereafter, and a steady state is reached 40 hours after the start of the reaction.

Figure 7:
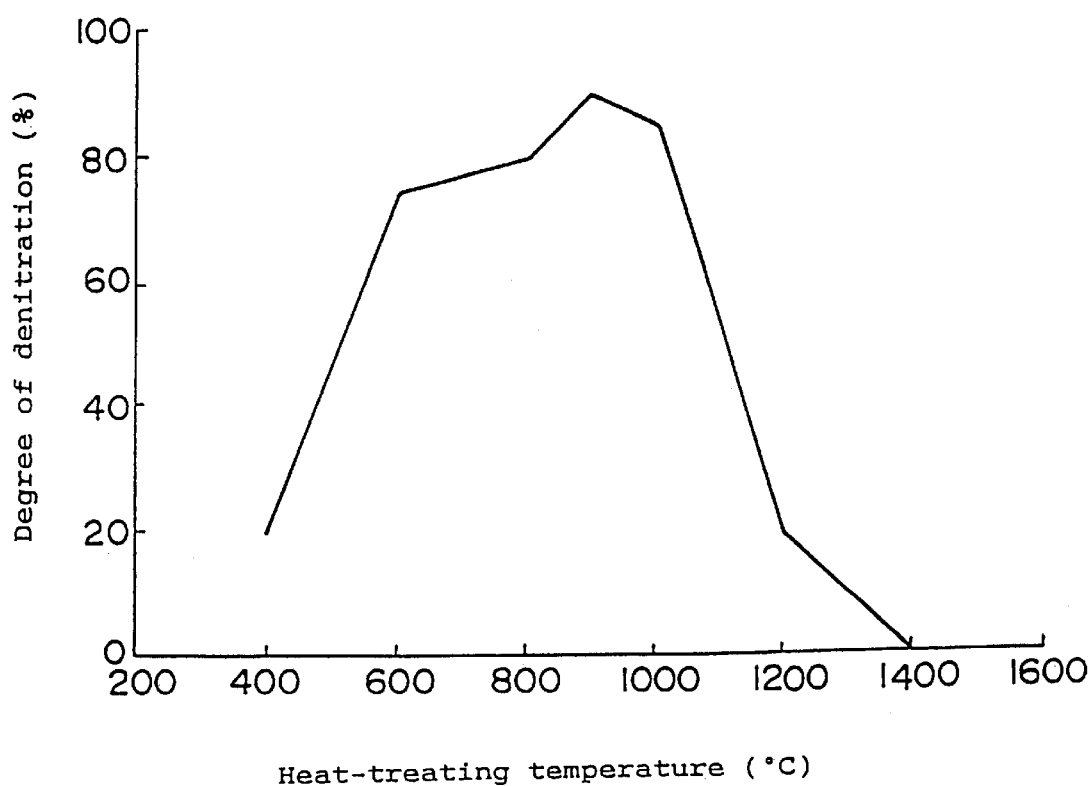
FIG. 7 is a graph showing the relationship between the heat-treating temperature of a pitch-based carbon fiber or a particulate active carbon and the degree of denitration.
Figure 8:
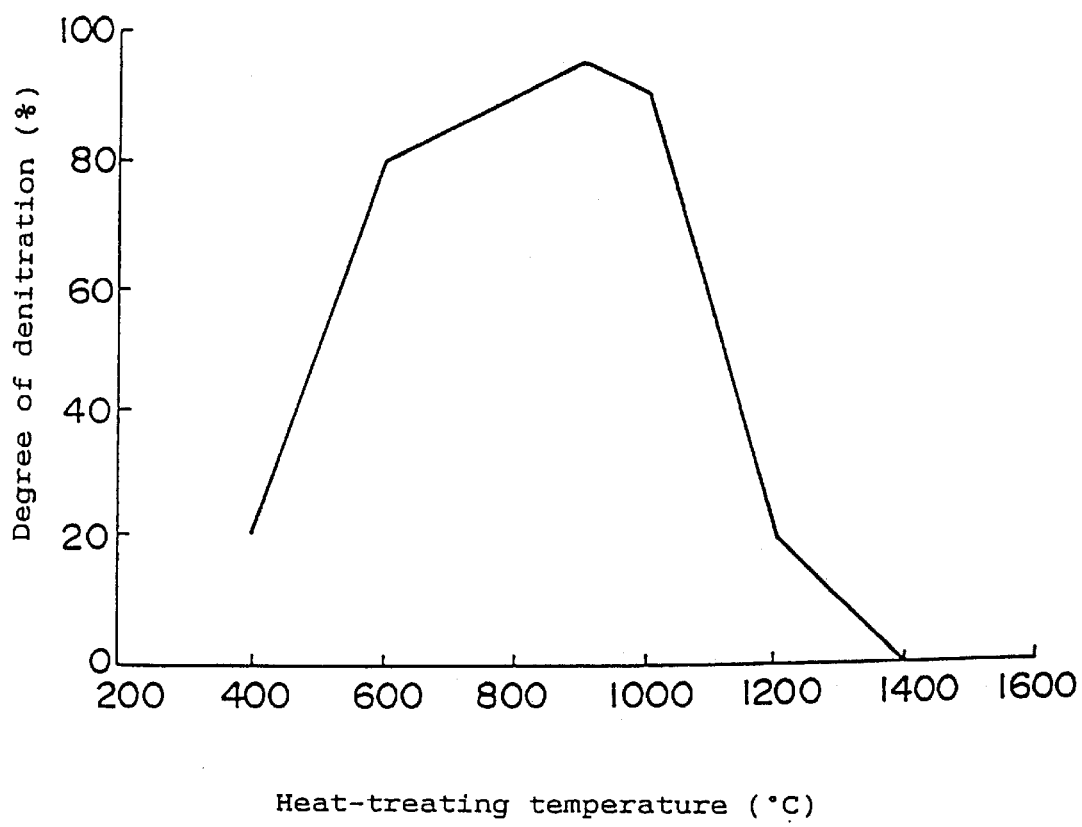
FIG. 8 is a graph showing the relationship between the heat-treating temperature of a polyacrylonitrile (PAN)-based carbon fiber and the degree of denitration.

FIGS. 7 and 8 show the relationship between the heat-treating temperature for the pitch-based or polyacrylonitrile (PAN)-based active carbon fiber or the particulate active carbon used as the starting active carbon and the degree of denitration in the steady state.

As shown in these figures, their activities vary according to the heat-treating temperature.

Thus, heat-treating temperatures in the range of 600 to 1,000° C. have been judged to be effective in the present invention.

Comparative Examples 2 and 3

When the pitch-based starting active carbon fiber (Comparative Example 2) and the PAN-based starting active carbon fiber (Comparative Example 3) were used without being subjected to any heat treatment, the degree of denitration was 18% and 4%, respectively.

EXAMPLE 5

Figure 9:
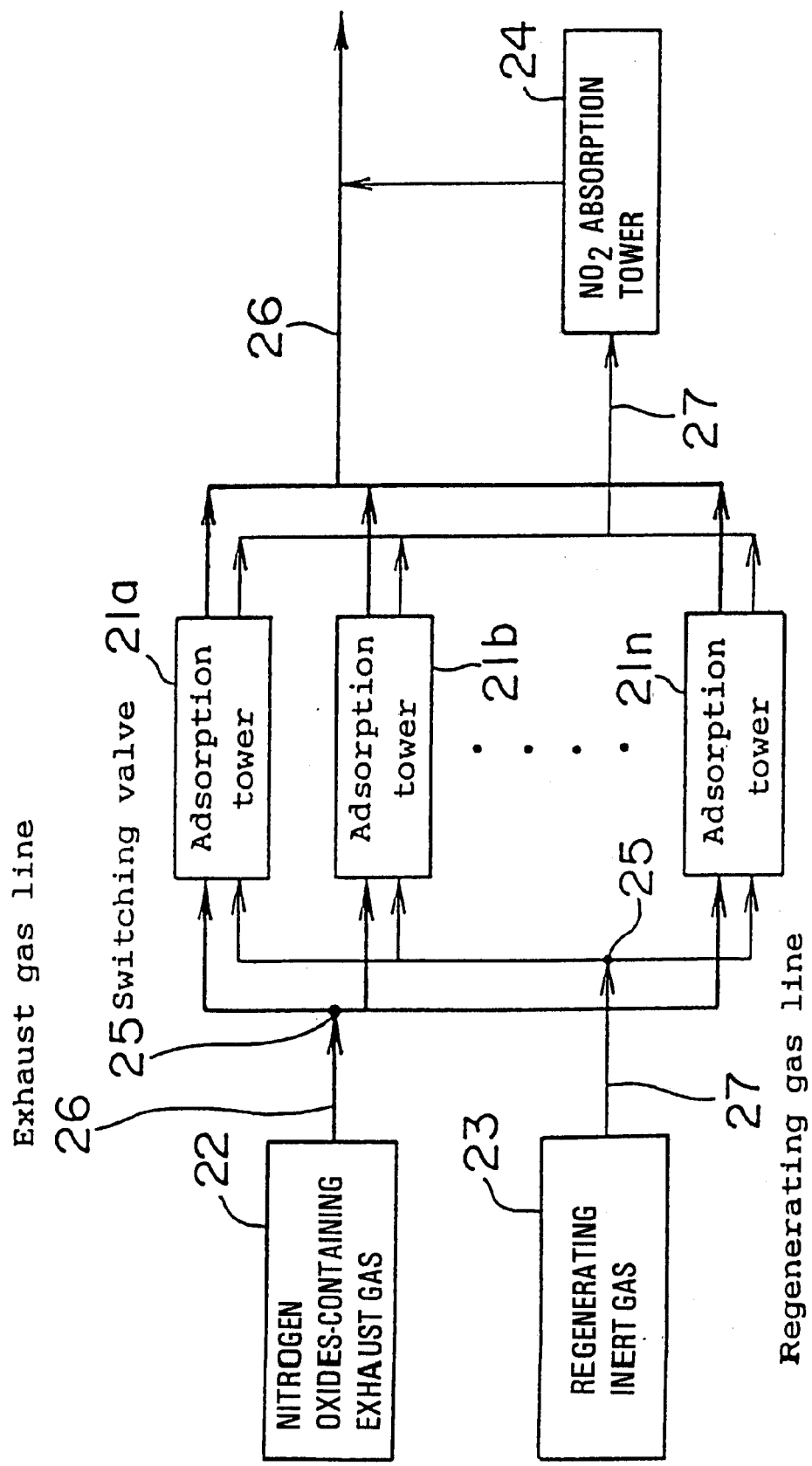
FIG. 9 is a block diagram of a system for carrying out the denitration process of the present invention.

FIG. 9 illustrates an exemplary system for the removal of nitrogen oxides in accordance with the present invention.

In FIG. 9, reference numerals 21*a* to 21*n* designate adsorption towers; 22, nitrogen oxides-containing exhaust gas; 23, a regenerating inert gas; 24, a nitrogen dioxide absorption tower; 25, switching valves; 26, an exhaust gas line; and 27, a regenerating gas line.

As shown in FIG. 9, two or more adsorption towers 21*a*, . . . , 21*n* are installed in parallel. Initially, nitrogen oxides-containing exhaust gas 22 is introduced into a first adsorption tower 21*a* by means of a switching valve 25. Thus, nitrogen oxides are oxidized by and adsorbed on a heat-treated active carbon fiber packed into the aforesaid first adsorption tower 21*a*.

The heat-treated active carbon fiber packed into the aforesaid first adsorption tower 21*a* is an active carbon fiber which has been heat-treated at a temperature of 600 to 1,000° C. in a non-oxidizing atmosphere. This heat-treated active carbon fiber promotes the reactions represented by the following equations (c), so that nitrogen oxides present in the introduced exhaust gas are reacted therewith and adsorbed thereon in the form of nitrogen dioxide ($NO_2$).

Before a breakthrough of the nitrogen dioxide ($NO_2$) formed by the oxidation of nitrogen oxides and adsorbed on the heat-treated active carbon fiber within first adsorption tower 21*a* occurs, the exhaust gas is successively switched to a second and other adsorption towers 21*b*, . . . , 21*n*. Thus, the exhaust gas is successively introduced thereinto by way of an exhaust gas line 26 and treated to remove nitrogen oxides therefrom.

The heat-treated active carbon fiber packed in each of the adsorption towers showing the aforesaid breakthrough is regenerated by introducing a regenerating inert gas 23 thereinto and releasing the nitrogen dioxide ($NO_2$) through a regeneration gas line 27.

In order to absorb the nitrogen dioxide ($NO_2$) released during the aforesaid regeneration process, the regeneration gas is introduced into an absorption tower 24 installed on the downstream side and containing an absorbing fluid such as water or an aqueous alkaline solution. Thus, the regeneration gas is continuously treated by promoting the reactions represented by the following equations (d).

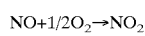

$$NO + 1/2 O_2 \rightarrow NO_2 \qquad (c)$$

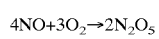

$$4NO + 3O_2 \rightarrow 2N_2O_5$$

$NO_2 + H_2O \rightarrow HNO_{3\, im}$ (d)

$N_2O_5 + H_2O \rightarrow 2HNO_3$

As the means for absorbing the aforesaid nitrogen dioxide ($NO_2$), there may be used any of various apparatus such as tray towers, packed towers, spray towers and stirred towers.

Figure 10:
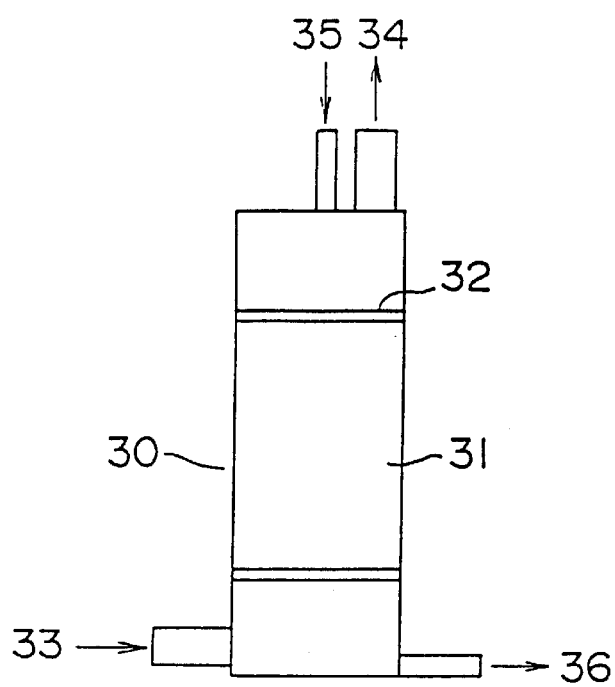
FIG. 10 is a schematic view of an exemplary absorption tower in accordance with the present invention.

FIG. 10 illustrates an embodiment in which a packed tower is used as the aforesaid absorption tower.

As shown in FIG. 10, exhaust gas is introduced through an exhaust gas inlet 33 provided at the bottom of an absorption tower 30, and the treated gas (i.e., freed of nitrogen oxides) is discharged from a treated gas outlet 34. An absorbing fluid such as water is introduced through an absorbing fluid inlet 35 provided above the packed region 31 of absorption tower 30 and distributed by a fluid distributor 32.

Thus, the introduced absorbing fluid flows through a corrosion-resistant porcelain packing material placed in packed region 31 and reacts with nitrogen dioxide ($NO_2$). Thereafter, the absorbing fluid is continuously withdrawn from an absorbing fluid outlet 36 provided at the bottom of absorption tower 30.

The heat-treated active carbon fiber for use in denitration, which is packed into the aforesaid adsorption towers, is one obtained by firing a pitch-based starting active carbon fiber (i.e., an active carbon fiber formed by the melt spinning of pitch obtained as residue in coal chemical and petrochemical processes) in a reducing atmosphere.

In this example, there was used a pitch-based starting active carbon fiber manufactured and sold by Osaka Gas Co., Ltd. under the trade name of "OG-5A". This pitch-based starting active carbon fiber was fired at about 850° C. in a non-oxidizing atmosphere for an hour, shaped into a corrugated form, and then used in this example.

Moreover, a polyacrylonitrile (PAN)-based starting active carbon fiber [e.g., "FE-300" (trade name); manufactured by Toho Rayon Co., Ltd.] obtained by firing and carbonizing a high-molecular-weight polyacrylonitrile fiber was also used as the starting active carbon fiber. Thus, the concentration of nitrogen oxides ($NO_x$) in exhaust gas could be reduced in the same manner as described above.

EXAMPLE 6

Figure 11:
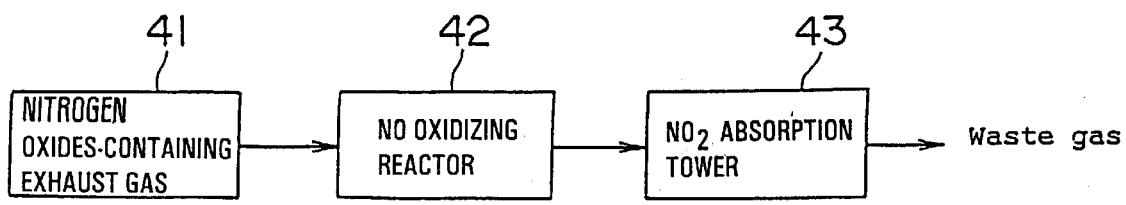
FIG. 11 is a block diagram of a system for carrying out the denitration process of the present invention.

FIG. 11 illustrates an embodiment in which the treatment of nitrogen oxides is carried out by means of a NO-oxidizing reactor packed with a heat-treated active carbon fiber.

In FIG. 11, reference numeral 42 designates a NO-oxidizing reactor; 41, nitrogen oxides-containing exhaust gas; and 43, a nitrogen dioxide absorption tower.

In this embodiment, the aforesaid NO-oxidizing reactor 42 is packed with the above-described heat-treated active carbon fiber having oxidizing activity. Thus, the introduced nitrogen oxides-containing exhaust gas 41 is oxidized and then continuously treated in an absorption tower 43.

In the above-described treatment, it is more preferable to treat nitrogen oxides present in exhaust gas continuously at a low temperature of 15°0 C. or below.

When applied to the removal of nitrogen oxides ($NO_x$) present in exhaust gas discharged from boilers, gas turbines, engines and combustion furnaces for burning various types of fuel, the above-described system for the removal of nitrogen oxides makes it possible to treat such exhaust gas.

Moreover, the present invention is also suitable for the removal of nitrogen oxides present in tunnels and for the removal of nitrogen oxides present in exhaust gas from nitric acid production plants.

Furthermore, similarly to the previously described $V_2O_5$ catalyst, the heat-treated active carbon fiber has an activity for decomposing nitrogen oxides to nitrogen ($N_2$) and water vapor ($H_2O$) on the basis of selective catalytic reduction (SCR) when nitrogen oxides ($NO_x$) and ammonia ($NH_3$) coexist. Accordingly, exhaust gas can also be denitrated by supplying an appropriate amount of $NH_3$, together with the exhaust gas, to the heat-treated active carbon fiber placed in the NO-oxidizing reactor.

EXAMPLE 7

Figure 12:
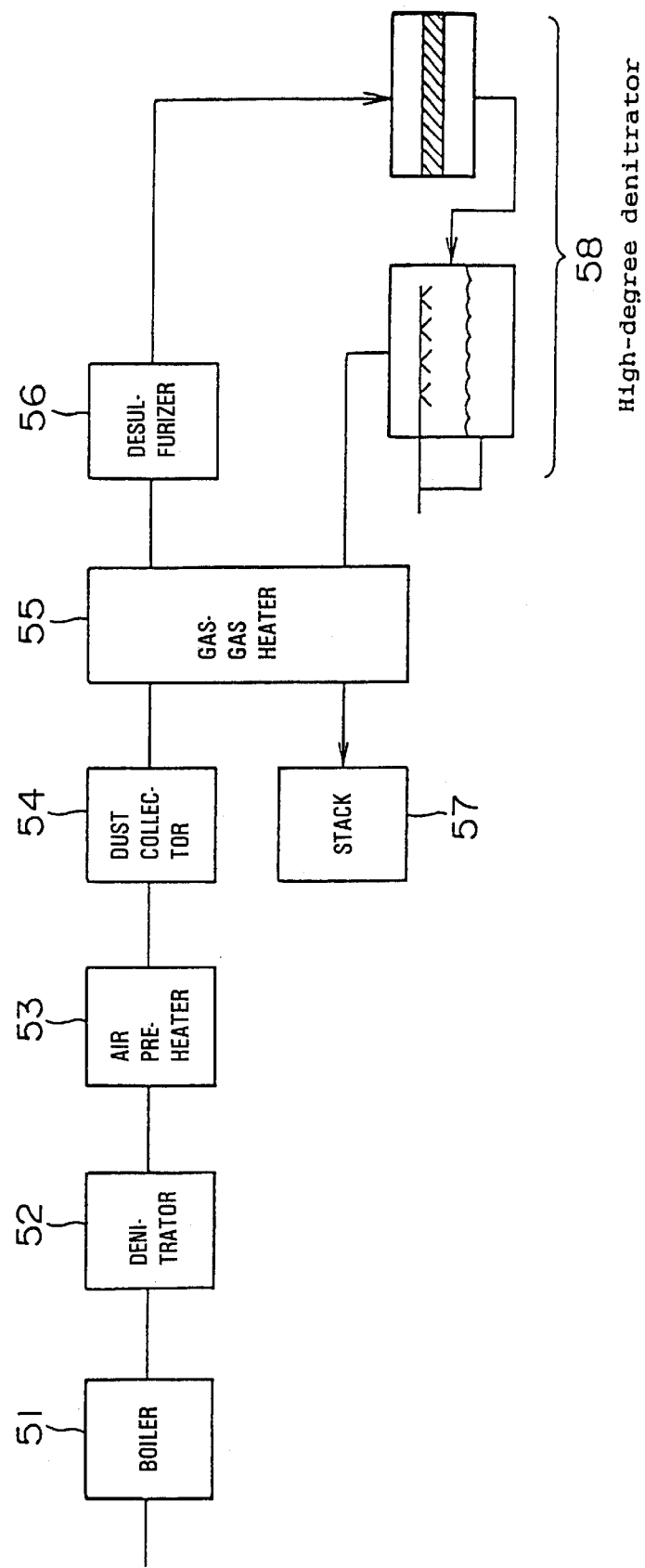
FIG. 12 is a block diagram of a system for carrying out the denitration process of the present invention.

FIG. 12 illustrates an exemplary system for carrying out the denitration process of the present invention.

In FIG. 12, reference numeral 51 designates a boiler; 52, a denitrator; 53, an air preheater; 54, a dust collector; 55, a gas-gas heater; 56, a desulfurizer; 57, a stack; and 58, a high-degree denitrator.

As shown in FIG. 12, exhaust gas discharged from a boiler 51 is passed through a denitrator 52 and a desulfurizer 56 where nitrogen oxides ($NO_x$) and sulfur oxides ($SO_x$) are removed therefrom in the same manner as in the prior art.

Thereafter, the exhaust gas is introduced into a high-degree denitrator 58 where it is brought into contact with an active carbon fiber heat-treated at a temperature in the range of 600 to 1,000° C. and packed into high-degree desulfurizer 58. Thus, the reactions represented by the foregoing equations (c) and (d) are promoted.

Consequently, when exhaust gas having a nitrogen oxide ($NO_x$) concentration of 400 ppm was treated by means of denitrator 52 and desulfurizer 56 in the same manner as in the prior art and the resulting gas having a $NO_x$ concentration of 40 ppm was further treated by means of the aforesaid high-degree desulfurizer 58, the concentration of nitrogen oxides.($NO_x$) in the exhaust gas could be reduced to 1 ppm or less.

The treating conditions employed in this example are given below.
(Treating Conditions)
 a) Gas to be treated
  Temperature: 50° C.
  Relative humidity: 60% R.H.
  $NO_x$ concentration: 40 ppm
  Flow rate: 50 m³/hr
 b) Denitrator
  Active carbon fiber: OG-5A
  Amount of catalyst: 8 kg
 c) Denitrated gas
  $NO_x$ concentration: 1 ppm In this removal of nitrogen oxides ($NO_x$), the water used in the aforesaid high-degree denitrator 58 may be replaced by an aqueous solution of sodium hydroxide or the like. Thus, the nitrogen oxides ($NO_x$) can be recovered as a salt of nitric acid (e.g., sodium nitrate) instead of nitric acid.

The heat-treated active carbon fiber packed into the aforesaid high-degree denitrator 58 is one obtained by firing a pitch-based starting active carbon fiber (i.e., an active carbon fiber formed by the melt spinning of pitch obtained as residue in coal chemical and petrochemical processes) in a reducing atmosphere.

In this example, there was used a pitch-based starting active carbon fiber manufactured and sold by Osaka Gas Co., Ltd. under the trade name of "OG-5A". This pitch-based starting active carbon fiber was fired at about 850° C. in a reducing atmosphere for an hour, shaped into a corrugated form, and then used in this example.

Moreover, a polyacrylonitrile (PAN)-based active carbon fiber obtained by firing and carbonizing a high-molecular-weight polyacrylonitrile fiber was also used as the heat-treated active carbon fiber. Thus, the concentration of nitrogen oxides ($NO_x$) in exhaust gas could be reduced to 1 ppm or less in the same manner as described above.

EXAMPLE 8

Figure 13:
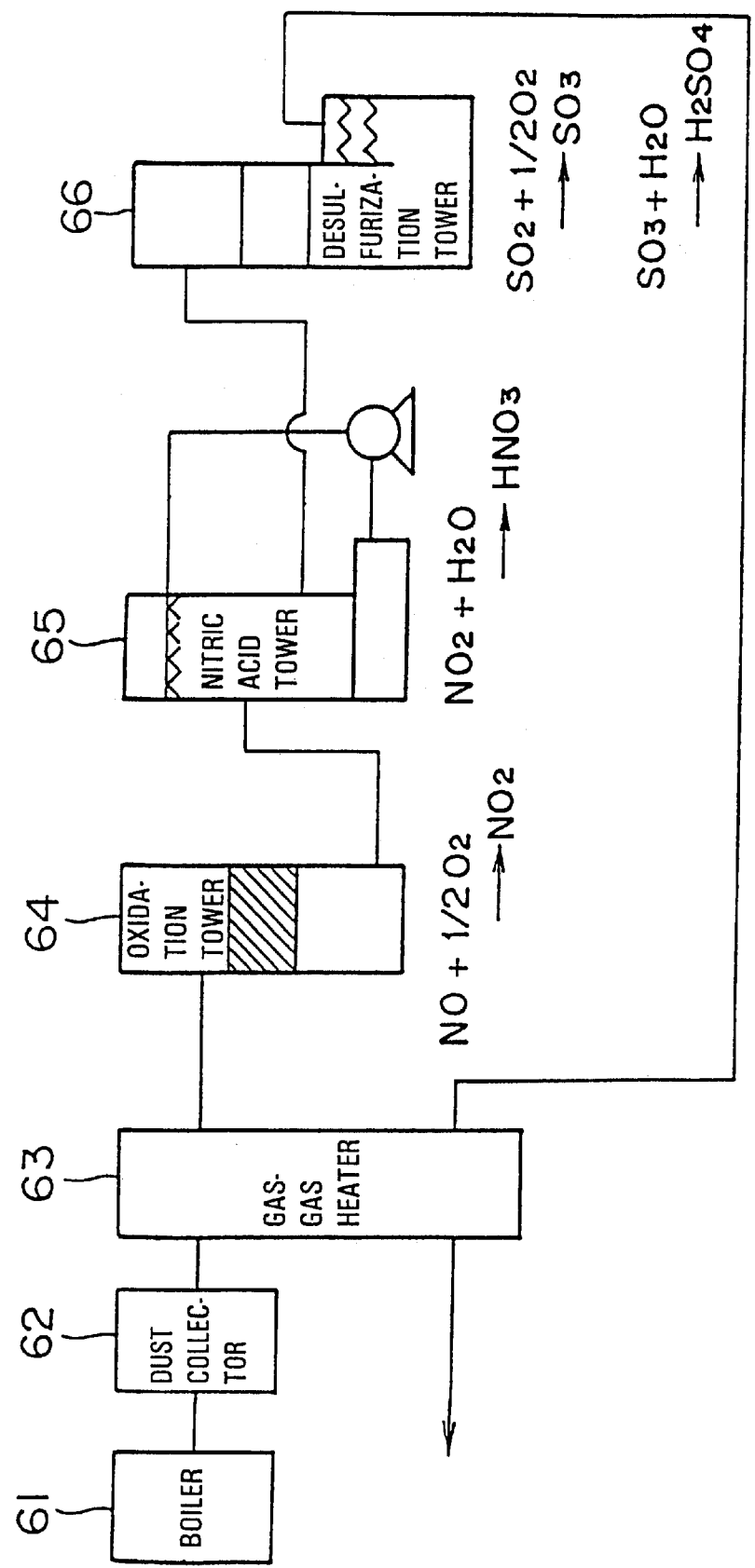
FIG. 13 is a schematic view illustrating a first embodiment of the exhaust gas treating system in accordance with the present invention.

FIG. 13 illustrates a first embodiment of the exhaust gas treating system of the present invention.

In FIG. 13, reference numeral 61 designates a boiler; 62, a dust collector; 63, a gas-gas heater; 64, an oxidation tower; 65, nitric acid tower; and 66, desulfurization tower.

As shown in FIG. 13, a dust collector 62 is installed at the outlet of boiler 61 or the like. Exhaust gas having passed through dust collector 62 is introduced into a gas-gas heater 63 where its temperature is lowered to about 90° C. and, moreover, its relative humidity is adjusted to 80% or less and preferably 60% or less. Then, the exhaust gas is introduced into an oxidation tower 64.

This oxidation tower 64 is packed with a heat-treated active carbon fiber in corrugated form, by which nitrogen oxides ($NO_x$) present in the exhaust gas are oxidized to nitrogen dioxide ($NO_2$) and dinitrogen pentoxide ($N_2O_5$) [the above equations (c)]. Then, the exhaust gas containing nitrogen dioxide ($NO_2$) and dinitrogen pentoxide ($N_2O_5$) is introduced into nitric acid tower 65 where they are reacted with water to form nitric acid [the above equations (d)]. Thus, nitrogen oxides ($NO_x$) present in the exhaust gas are removed.

Alternatively, the water used in the aforesaid nitric acid tower 65 may be replaced by an aqueous solution of sodium hydroxide or the like. Thus, the nitrogen oxides ($NO_x$) can be recovered as a salt of nitric acid (e.g., sodium nitrate) instead of nitric acid.

Thereafter, the exhaust gas freed of nitrogen oxides ($NO_x$) is humidified to a relative humidity of 100% or greater in nitric acid tower 65 and then introduced into a desulfurization tower 66 packed with a heat-treated active carbon fiber in corrugated form. In this desulfurization tower 66, sulfur oxides ($SO_x$) are oxidized to sulfur trioxide ($SO_3$) [the above equation (a)] and the latter is then reacted with water to form sulfuric acid [the above equation (b)]. Thus, sulfur oxides ($SO_x$) present in the exhaust gas freed of nitrogen oxides ($NO_x$) are removed.

Thereafter, the exhaust gas is heated in gas-gas heater 63 and discharged from a stack.

The temperature of the exhaust gas is as low as 100° C. or below and preferably 50° C. or below.

Also in this removal of sulfur oxides ($SO_x$), the water used in the aforesaid desulfurization tower 66 may be replaced by an aqueous solution of sodium hydroxide or the like, similarly to the removal of nitrogen oxides ($NO_x$). Thus, the sulfur oxides ($SO_x$) can be recovered as a salt of sulfuric acid (e.g., sodium sulfate) instead of sulfuric acid.

In this embodiment, the heat-treated active carbon fibers packed into the aforesaid nitric acid tower 65 and desulfurization tower 66 are ones obtained by firing a pitch-based starting active carbon fiber in a non-oxidizing atmosphere. More specifically, the heat-treated active carbon fiber used for the treatment of nitrogen oxides ($NO_x$) in this example is one obtained by firing a pitch-based starting active carbon fiber at about 850° C. for an hour and shaping it into-a corrugated form, and the heat-treated active carbon fiber used for the treatment of sulfur oxides ($SO_x$) in this example is one obtained by firing a pitch-based starting active carbon fiber at about 1,100° C. for an hour and shaping it into a corrugated form. However, it is to be understood that the present invention is not limited thereto.

Figure 14:
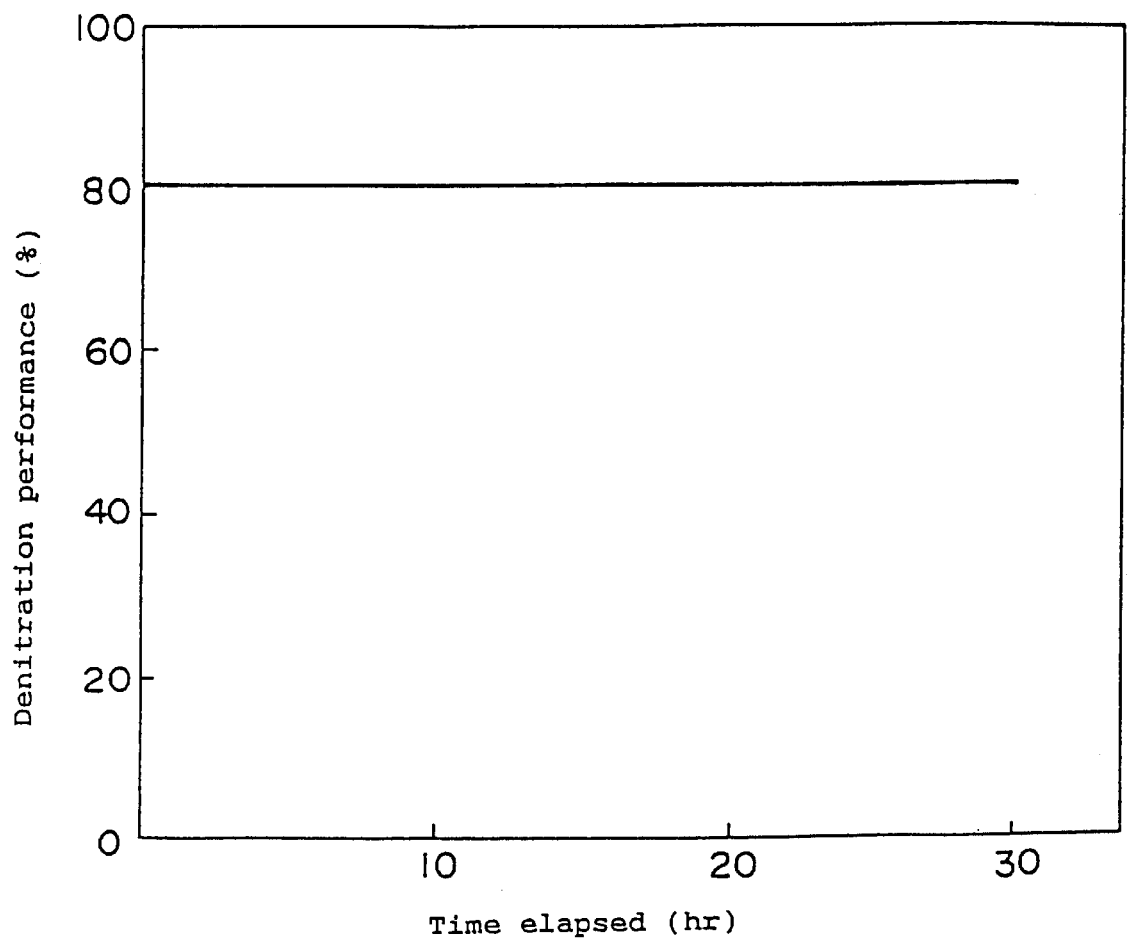
FIG. 14 is a graph showing the performance on the oxidation of nitrogen monoxide to nitrogen dioxide ($NO_2$)

FIG. 14 shows the performance on the oxidation of nitrogen monoxide (NO) to nitrogen dioxide ($NO_2$). As shown in FIG. 14, high performance of 80% or greater can be achieved stably.

Figure 15:
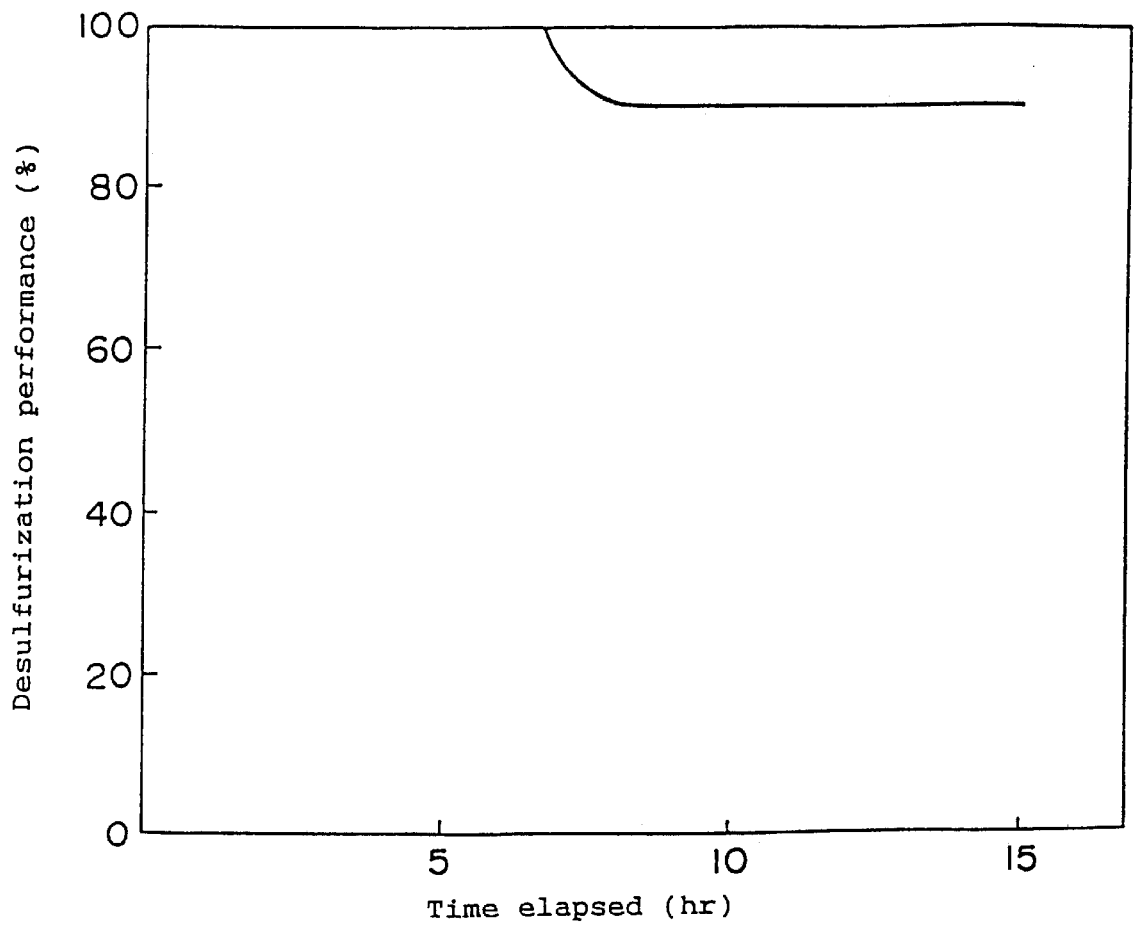
FIG. 15 is a graph showing the performance on the oxidation of sulfur dioxide ($SO_2$) to sulfur trioxide ($SO_3$)

FIG. 15 shows the performance on the oxidation of sulfur dioxide ($SO_2$) to sulfur trioxide ($SO_3$). As shown in FIG. 15, high performance of 95% or greater can be achieved stably.

EXAMPLE 9

Figure 16:
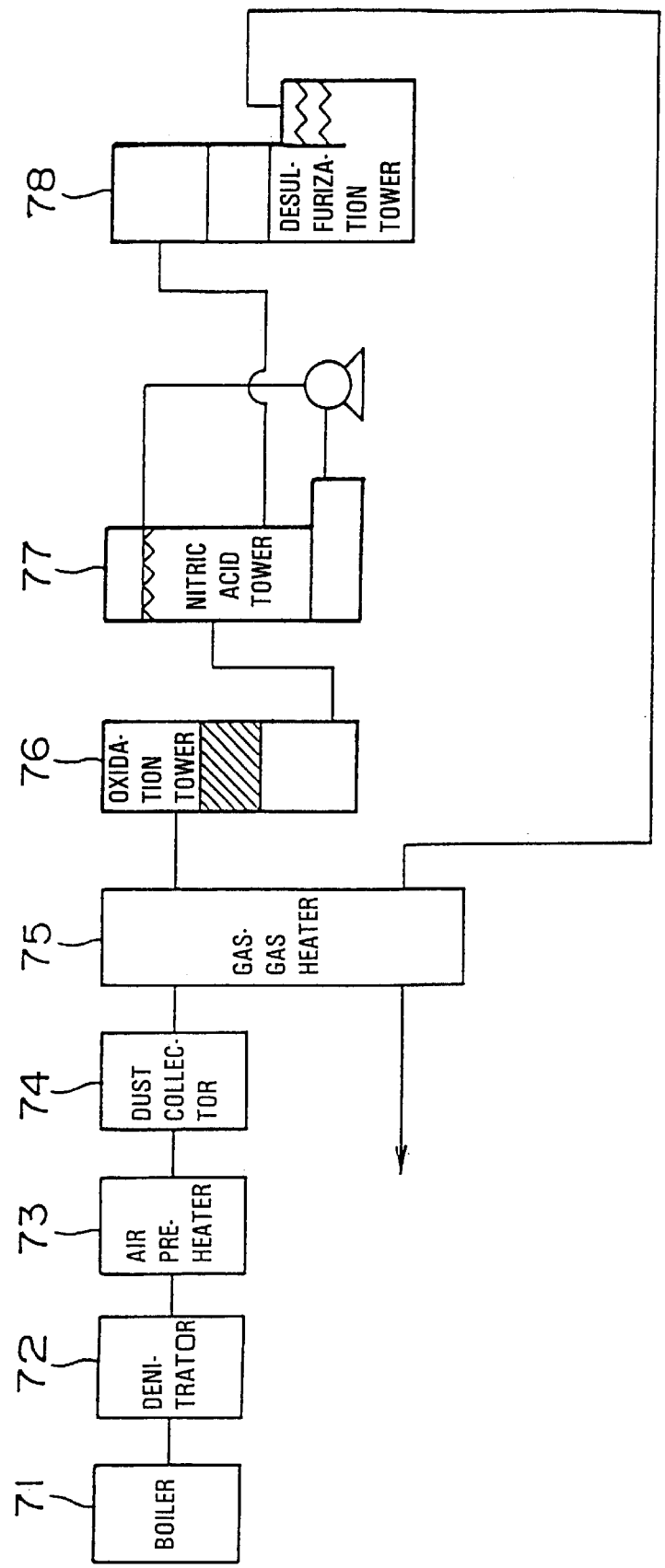
FIG. 16 is a schematic view illustrating a second embodiment of the exhaust gas treating system in accordance with the present invention.

FIG. 16 illustrates a second embodiment of the exhaust gas treating system of the present invention.

As shown in FIG. 16, a denitrator 72 is installed at the outlet of a boiler 71 or the like, and an air preheater 73 is installed at the outlet of denitrator 72 so as to lower the temperature of exhaust gas to about 130° C.

In this embodiment, exhaust gas is first denitrated by means of a conventional denitrator 72. Thereafter, the high-degree removal of nitrogen oxides ($NO_x$) present in the exhaust gas and the removal of sulfur oxides ($SO_x$) present therein are carried out by means of the denitration and desulfurization system of Example 8 using heat-treated active carbon fibers.

As shown in FIG. 16, after exhaust gas is denitrated by means of denitrator 72 based on high-temperature treatment, it is passed through the aforesaid air preheater 73, dedusted in a dust collector 74, and further cooled to about 90° C. in a gas-gas heater 75. Thereafter, in the same manner as in the first embodiment, the exhaust gas is treated by means of an oxidation tower 76 packed with a heat-treated active carbon fiber in corrugated form, by which the nitrogen oxides ($NO_x$) remaining in the exhaust gas are oxidized. Then, the exhaust gas containing nitrogen dioxide ($NO_2$) and dinitrogen pentoxide ($N_2O_5$) is introduced into a nitric acid tower 77 where they are reacted with water to form nitric acid. Thus, nitrogen oxides ($NO_x$) present in exhaust gas are removed.

As described above, this system can be connected with a conventionally used denitrator to achieve a further improvement in denitration performance and hence in treating capacity.

Similarly, this system can also be connected with a system having a conventional desulfurizer to achieve a further improvement in desulfurization performance.

EXAMPLE 10

Figure 17:
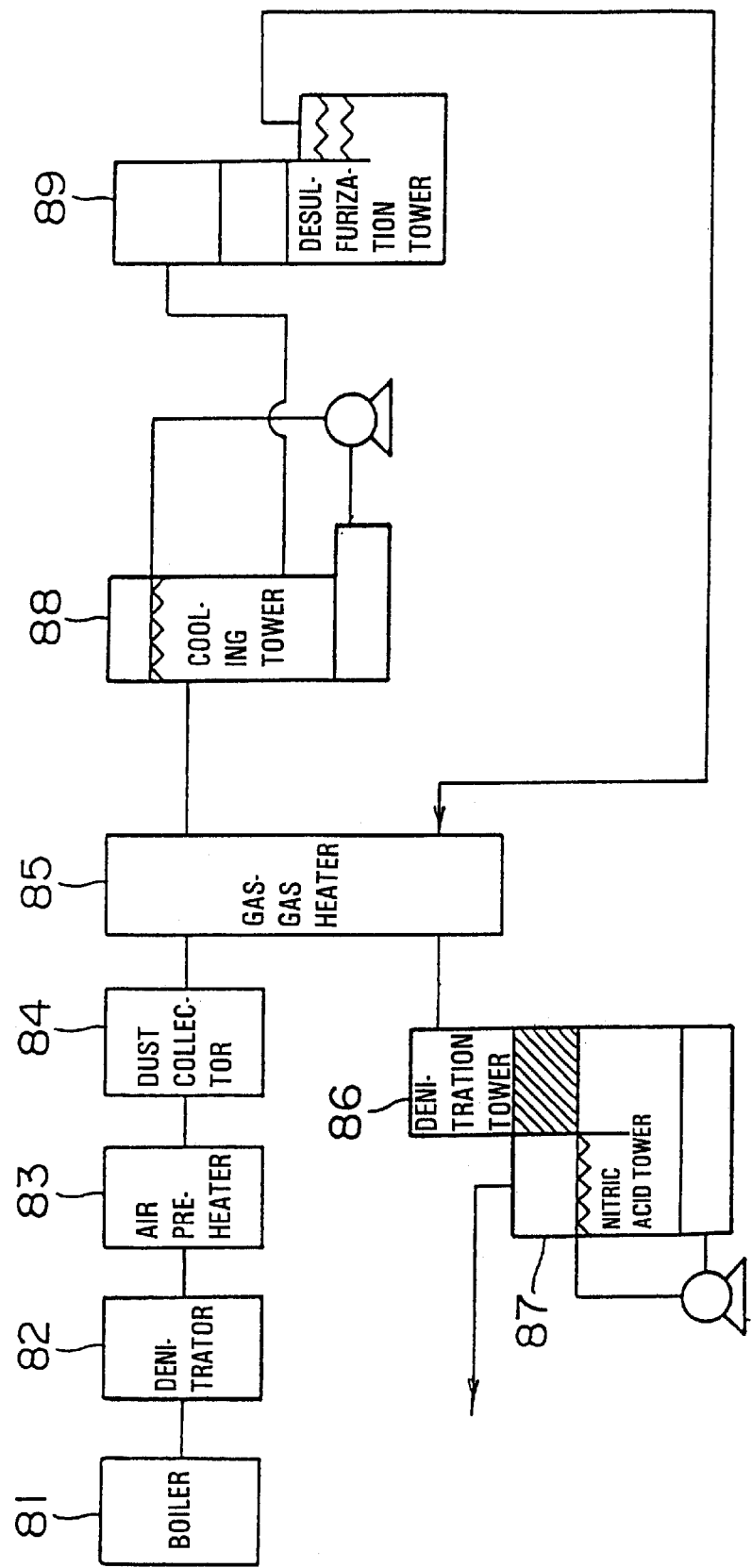
FIG. 17 is a schematic view illustrating a third embodiment of the exhaust gas treating system in accordance with the present invention.
Figure 18:
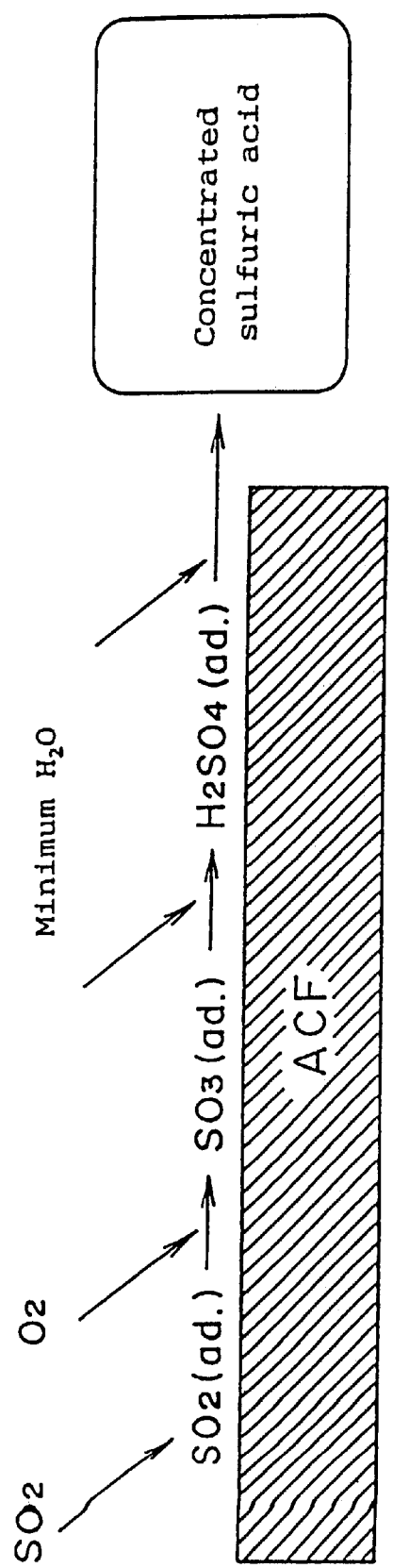
FIG. 18 is a schematic view showing the manner in which $SO_2$ is removed on the surface of an active carbon in accordance with the present invention.

FIG. 17 illustrates a third embodiment of the exhaust gas treating system of the present invention.

As shown in FIG. 17, exhaust gas from a boiler 81 is dedusted in a dust collector 84, cooled to about 90° C. in a gas-gas heater 85, and then introduced into a cooling tower 88 where it is further cooled to 50° C. or below and humidified to a relative humidity of 100% or greater. The resulting low-temperature/high-humidity exhaust gas is introduced into a desulfurization tower 89 packed with a heat-treated active carbon fiber in corrugated form, where sulfur oxides ($SO_x$) are recovered as sulfuric acid or a salt thereof.

In this embodiment, sulfur oxides ($SO_x$) are removed by oxidizing them in desulfurization tower 89 and reacting the resulting sulfur trioxide with water to form sulfuric acid.

The exhaust gas freed of sulfur oxides ($SO_x$) is passed again through gas-gas heater 85 constituting a cooling tower, and thereby heated to about 90° C. Then, it is introduced into a denitration tower 86 packed with a heat-treated active carbon fiber, where nitrogen oxides ($NO_x$) present in the exhaust gas are oxidized to nitrogen dioxide ($NO_2$). Thereafter, the nitrogen dioxide ($NO_2$) is removed as nitric acid in a nitric acid tower 87.

In this embodiment, the relative humidity of exhaust gas is regulated by cooling the exhaust gas in cooling tower 88 before introducing it into desulfurization tower 89. However, its relative humidity may also be regulated by omitting cooling tower 88 and adding steam to the exhaust gas without cooling it.

What is claimed is:

1. A process for removing nitrogen oxides comprising the steps of:

passing exhaust gas containing nitrogen oxides through a nitrogen oxide oxidation tower to oxidize and remove the nitrogen oxides in a contact step, wherein said nitrogen oxide oxidation tower is packed with a heat-treated active carbon fiber which is obtained by heat treating a starting active carbon in a non-oxidizing atmosphere at a temperature of 600 to 1,000° C., said process further comprising the step of continuously absorbing the nitrogen oxides adsorbed on the heat-treated active carbon fiber into an absorbing fluid, wherein the starting active carbon fiber is one chosen from the group consisting of polyacrylonitrile-based and pitch-based fibers, wherein the oxidation of nitrogen oxides is carried out at a temperature of 150° C. or lower.

2. The process of claim 1, wherein the non-oxidizing atmosphere is an atmosphere of nitrogen gas.

3. A process for treating an exhaust gas containing nitrogen oxides and sulfur oxides, comprising:

treating said exhaust gas with a heat-treated active carbon fiber which is obtained by heat treating a starting active carbon fiber in a non-oxidizing atmosphere; and recovering said nitrogen oxides as nitric acid or a salt thereof and recovering said sulfur oxides as sulfuric acid or a salt thereof;

wherein the relative humidity of the gas being treated is 100% or higher when the sulfur oxides are recovered as sulfuric acid or a salt thereof.

4. The process of claim 3, wherein the temperature of the gas being treated is 100° C. or lower.

5. The process of claim 3, wherein the relative humidity of the gas being treated is 80% or less when the nitrogen oxides are recovered as nitric acid or a salt thereof.

* * * * *